July 10, 1951     H. SHAWBROOK ET AL     2,560,005

RESILIENT TELESCOPIC DEVICE

Filed Feb. 13, 1950

Inventors
HENRY SHAWBROOK,
ARTHUR EDWARD BINGHAM,
By Reynolds, Beach & Christensen
Attorney Patented July 10, 1951

2,560,005

UNITED STATES PATENT OFFICE 2,560,005

RESILIENT TELESCOPIC DEVICE

Henry Shawbrook, New York, N. Y., and Arthur E. Bingham, Cheltenham, England, assignors to Dowty Equipment Limited, Cheltenham, England Application February 13, 1950, Serial No. 143,852
In Great Britain February 14, 1949

16 Claims. (Cl. 267—64)

1

There is a telescopic resilient device known as a liquid spring, in which a plunger is movable through one end of a cylinder containing liquid filling the maximum available space within the cylinder so that during contraction of the device the liquid is compressed by the increasing plunger volume received within the cylinder. Recoil or extension of the device is brought about by the restoring forces of the compressed liquid. Provision is usually made for energy dissipation, at least during recoil, by one or more damping orifices, and the liquid used as the resiliently compressible medium may also be the liquid used for energy dissipation or damping. Devices of this kind form the subjects of United States Patents Nos. 2,346,667 and 2,333,095.

These devices are most commonly used in aircraft or land vehicle suspension systems, and it frequently arises that the ambient temperature at which the devices have to operate is at or below zero degrees centigrade. Hitherto a single liquid has been chosen as the resiliently compressible medium, this liquid having a freezing point well below all normal operating temperatures. Nevertheless the characteristics of the device vary to some extent with variations in ambient temperature.

It may be desirable to counter these variations, more especially when the temperature is at or below zero centigrade, and it is the object of the present invention to provide means for this purpose.

The characteristic feature of the invention resides in the fact that part of the volume of the resiliently compressible liquid medium comprises a liquid which expands upon freezing and has a freezing point within the normal operating temperature range, and which is contained within and at all times fills a chamber of variable volume.

When the liquid enclosed within the said chamber freezes, its expansion will have a compensatory effect on the change brought about by the fall in temperature in the main liquid, which itself has a freezing point below all normal operating temperatures.

If desired two or more chambers of variable volume may be used to enclose within the main chamber and liquid, two or more different liquids, respectively, having different freezing points within the normal operating range so that compensation will take place in a corresponding number of stages.

In order that the invention may be more clearly understood and readily carried into effect some embodiments thereof will now be described by way of example with reference to the accompanying diagrammatic drawings; of which:

Figure 1:
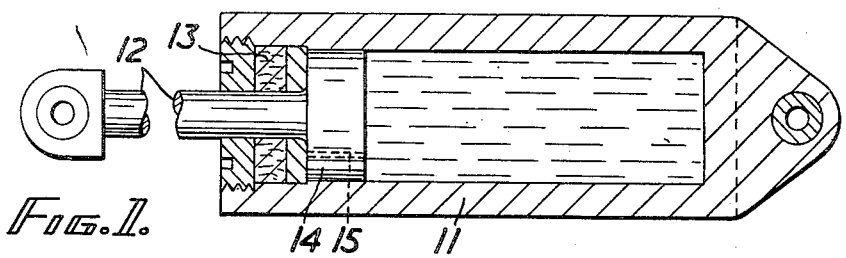
Figure 1 is a sectional elevation of a typical liquid spring device having, in accordance with the known art, a single resiliently compressible liquid.

As shown in Figure 1, a liquid spring telescopic resilient device comprises a cylinder 11 and a plunger 12 which is slidable telescopically with respect to the cylinder 11 through a liquid-tight sealing gland 13. The outer ends of the cylinder 11 and plunger 12 are adapted to be pin-jointed with sprung and un-sprung parts of the suspension system. The plunger 12 carries a damping head 14 in the form of a piston slidably fitting the cylinder 11, the piston 14 having a restricted orifice 15 extending therethrough for the purposes of providing for energy dissipation.

The cylinder 11 of the device shown in Figure 1 contains liquid which fills the maximum available space within the cylinder, that is to say the cylinder 11 is completely full of liquid when the plunger 12 is outermost. When the device is subjected to loads operating in compression, the plunger 12 will be forced into the cylinder 11 with consequent compression of the liquid. On relief of the loads the plunger 12 will be returned to its extended position by the restoring forces of the entrapped liquid. The restricted orifice 15 will control rebound of the plunger 12.

The damping head 14 is not an essential to the present invention, and the liquid spring device may take a variety of forms.

One of the liquids commonly used as the resiliently compressible medium is the liquid known in the United Kingdom as DTD. 585 and in the United States of America as AN-0-366. This liquid freezes at approximately $-65°$ C. The normal operating temperature range of the device may include temperatures as low as $-45°$ C.

Figure 2:
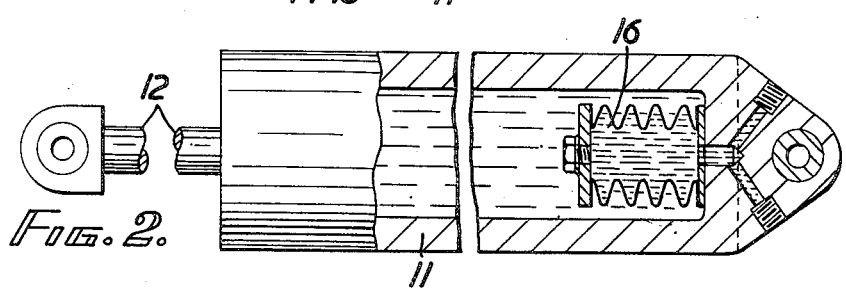
Figure 2 is a sectional elevation of a device similar to Figure 1 but having an additional liquid in accordance with the invention.

Figure 2 shows a liquid spring device similar to Figure 1 but having in the closed end wall of the cylinder a variable volume chamber in the form of a metallic bellows 16. The stroke of the liquid spring device is limited so that the bellows 16 is situated in the unswept volume of the cylinder 11.

The bellows device 16 is filled with a liquid such as is hereinafter specified which has a freezing point above $-45°$ C. and this liquid will occupy approximately one third of the total liquid capacity of the cylinder 11.

The following data gives the results of tests carried out to demonstrate the present invention.

Test A was carried out with the cylinder 11 wholly filled with DTD. 585;

Test B with a separate chamber containing water representing 22% of the total liquid volume;

Test C with 27% water mixed with 3% alcohol;

Test D with 27% water mixed with 3% glycerine; and

Test E with 22.8% water mixed with 5.7% glycerine.

Results of the five tests showing percentage volume variation with lowering temperatures are tabulated below; the standard volume being taken at 20° C.

| Temperature, °C. | Per Cent Change in Volume | | | | |
| --- | --- | --- | --- | --- | --- |
|  | A | B | C | D | E |
| 20 | 0 | 0 | 0 | 0 | 0 |
| 15 | −0.39 | −0.39 | −0.39 | −0.25 | −0.25 |
| 10 | −0.80 | −0.80 | −0.60 | −0.55 | −0.50 |
| 5 | −1.20 | −1.20 | −0.92 | −0.83 | −0.75 |
| 0 | −1.66 | −1.66 | −1.19 | −1.16 | −1.05 |
| −3 | −1.82 | −1.80 | −1.35 | −1.28 | −1.12 |
| −5 |  |  |  | −1.03 | −1.28 |
| −6 | −2.16 | +0.35 | −1.54 |  |  |
| −8 |  |  |  | −0.25 | −1.46 |
| −10 | −2.39 | +0.05 | −0.65 | −0.14 | −1.25 |
| −13 |  |  |  | −0.16 | −1.20 |
| −15 | −2.82 | −0.38 | −0.67 | −0.20 | −1.19 |
| −18 |  |  |  | −0.24 | −1.17 |
| −20 | −3.24 | −0.75 | −0.83 | −0.32 | −1.15 |
| −25 | −3.63 | −1.10 | −1.00 | −0.51 | −1.21 |
| −30 | −4.02 | −1.50 | −1.20 | −0.73 | −1.35 |
| −35 | −4.41 | −1.96 | −1.38 | −0.93 | −1.53 |

Figure 3:
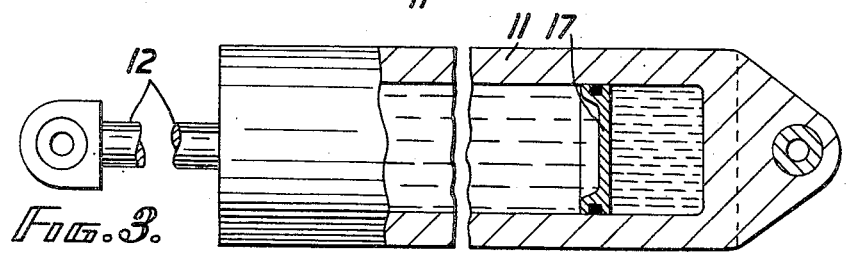
Figures 3, 4, and 5 are views similar to Figure 2 but illustrating modifications.

A consideration of the above data shows that a satisfactory compensating effect is obtained when the resiliently compressible liquid medium includes 27% of water with 3% glycerine enclosed within a chamber of variable volume and thus separated from the main liquid. Whereas the main liquid if used alone would undergo −4% change in volume as the temperature falls from 20° C. to −30° C., the presence of the water and glycerine mixture reduces the contraction to −0.73% for the same temperature variation. The chamber for the compensating liquid may, see Figure 3, form part of the main cylinder and be defined by a floating piston 17 which is sealed with respect to the cylinder wall.

Figure 4:
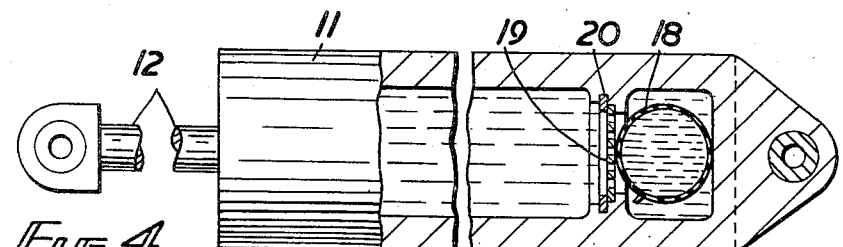
Figure 5:
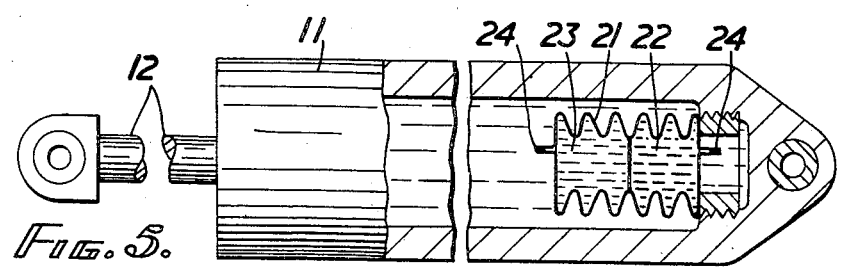

Again the chamber of variable volume enclosing the compensatory liquid may be a rubber or similar flexible bag or ball 18 as shown in Figure 4. The container 18 is retained at the closed end of the cylinder by an open-work grating 19 held in by a circlip 20. More than a single compensatory liquid may be used, and Figure 5 shows a double-ended bellows device 21 which may contain one liquid in the space 22 and a different liquid in the space 23, said liquids having different freezing points within the normal operating range so that the compensating effect will take place in two stages.

In all cases the chamber of variable volume is filled under vacuum to ensure the absence of air. In Figure 5 the ends of the bellows device 21 are each shown with an outstanding tube 24. The tube 24 serves as the inlet during filling of the chamber and may be sealed by pinching and brazing.

It will be apparent that the embodiments of the invention shown in the drawings are diagrammatic examples, and that the chamber or chambers for the compensatory liquid or liquids may take other forms. For example, it is possible to form the chamber as an annulus around the plunger of the liquid spring device. Again, the chamber could be attached to the damping head in cases where the latter forms part of the liquid spring.

We claim:

1. A liquid spring type resilient telescopic device, including a casing defining a main chamber wholly filled with a liquid medium, and a plunger movable thereinto under load to reduce the volume of said chamber and thereby to compress such liquid medium resiliently, the plunger being movable outwardly of the chamber by the resilience of the liquid medium upon relief of such load, said liquid spring device being characterized in that a portion only of the resiliently compressible liquid medium comprises a subsidiary liquid medium having the characteristic of expanding upon freezing, and which has a freezing point within the normal operating temperature range, the remainder of the liquid medium having a lower freezing point, and a supplemental chamber of variable volume in free pressure-exchange relationship with the interior of said main chamber and at all times wholly filled with said liquid of higher freezing point.

2. A liquid spring type resilient telescopic device of the type defined in claim 1, characterised in that a proportion of the resiliently compressible liquid medium comprises a plurality of different liquids which expand upon freezing and have different freezing points within the normal operating temperature range, said plurality of liquids being contained within and at all times filling individual chambers of variable volume which separate said liquids from one another and from the remainder of the liquid medium.

3. A vehicle or aircraft suspension system comprising a cylinder glanded for the reception of a plunger slidable telescopically with respect to the cylinder, and liquid filling the maximum available space within the cylinder and compressible by plunger movement under load; in which a proportion of the resiliently compressible liquid medium comprises a liquid which expands upon freezing and has a freezing point within the normal operating temperature range, a supplemental chamber of variable volume which contains said proportion of the liquid and which separates it from the remainder of the liquid, said cylinder and said supplemental chamber being in free pressure-exchange relationship, and the remainder of the liquid having a freezing point below the normal operating temperature range.

4. A vehicle or aircraft suspension system comprising a cylinder glanded for the reception of a plunger slidable telescopically with respect of the cylinder, and liquid filling the maximum available space within the cylinder and compressible by plunger movement under load; in which a proportion of the resiliently compressible liquid medium comprises a plurality of different liquids each of which expands upon freezing and which have different freezing points within the normal operating temperature range, a plurality of chambers individual to each of said plurality of liquids, and contained within said cylinder, each of said chambers being of variable volume and serving to separate said liquids from one another and from the remainder of the liquid, and the remainder of the liquid having a freezing point below the normal operating temperature range.

5. A liquid spring device according to claim 1, in which the said portion of the liquid medium of higher freezing point consists mainly of water.

6. A liquid spring device according to claim 5 in which the water represents approximately one-third of the total liquid medium.

7. A liquid spring device according to claim 1 in which the chamber of variable volume comprises a metallic bellows.

8. A liquid spring device according to claim 7 in which the bellows is attached to a closed end of the liquid spring cylinder.

9. A liquid spring device according to claim 1 in which the chamber of variable volume comprises a floating piston in slidable sealing engagement within the liquid spring cylinder.

10. A liquid spring device according to claim 1 in which the chamber of variable volume comprises an enclosure of rubberlike material.

11. A liquid spring device according to claim 1, wherein the chamber of variable volume is itself subdivided into a plurality of independent compartments independently variable in volume, and each completely filled with a different liquid medium of higher freezing point than the liquid which fills the main chamber, but of severally different freezing points.

12. A liquid spring device according to claim 1, in which the portion of the liquid medium of higher freezing point consists essentially of water and a modifier which lowers the normal freezing point of the water.

13. A liquid spring device as in claim 12, wherein the modifier is glycerine.

14. A liquid spring device according to claim 1, in which the portion of the liquid medium of higher freezing point consists essentially of water to the extent of approximately 27% of the total liquid volume modified by the addition of 3% glycerine.

15. A liquid spring device according to claim 1, in which the portion of the liquid medium of higher freezing point consists essentially of water to the extent of approximately 27% of the total liquid volume, modified by the addition of 3% alcohol.

16. A liquid spring device according to claim 1, in which the portion of the liquid medium of higher freezing point consists essentially of water to the extent of approximately 22.8% of the total liquid volume, modified by the addition of 5.7% glycerine.

HENRY SHAWBROOK.
ARTHUR E. BINGHAM.

REFERENCES CITED

The following references are of record in the file of this patent:

UNITED STATES PATENTS

| Number | Name | Date |
| --- | --- | --- |
| 1,736,984 | Sheats | Nov. 26, 1929 |
| 2,187,258 | Wood | Jan. 16, 1940 |
| 2,333,095 | Dowy | Nov. 2, 1943 |

FOREIGN PATENTS

| Number | Country | Date |
| --- | --- | --- |
| 702,868 | France | Jan. 27, 1931 |